No. 845,329. PATENTED FEB. 26, 1907.
J. W. BOTTOMLEY.
PLASTIC BRICK OR LIKE MOLDING MACHINE.
APPLICATION FILED OCT. 12, 1906.
3 SHEETS—SHEET 1.
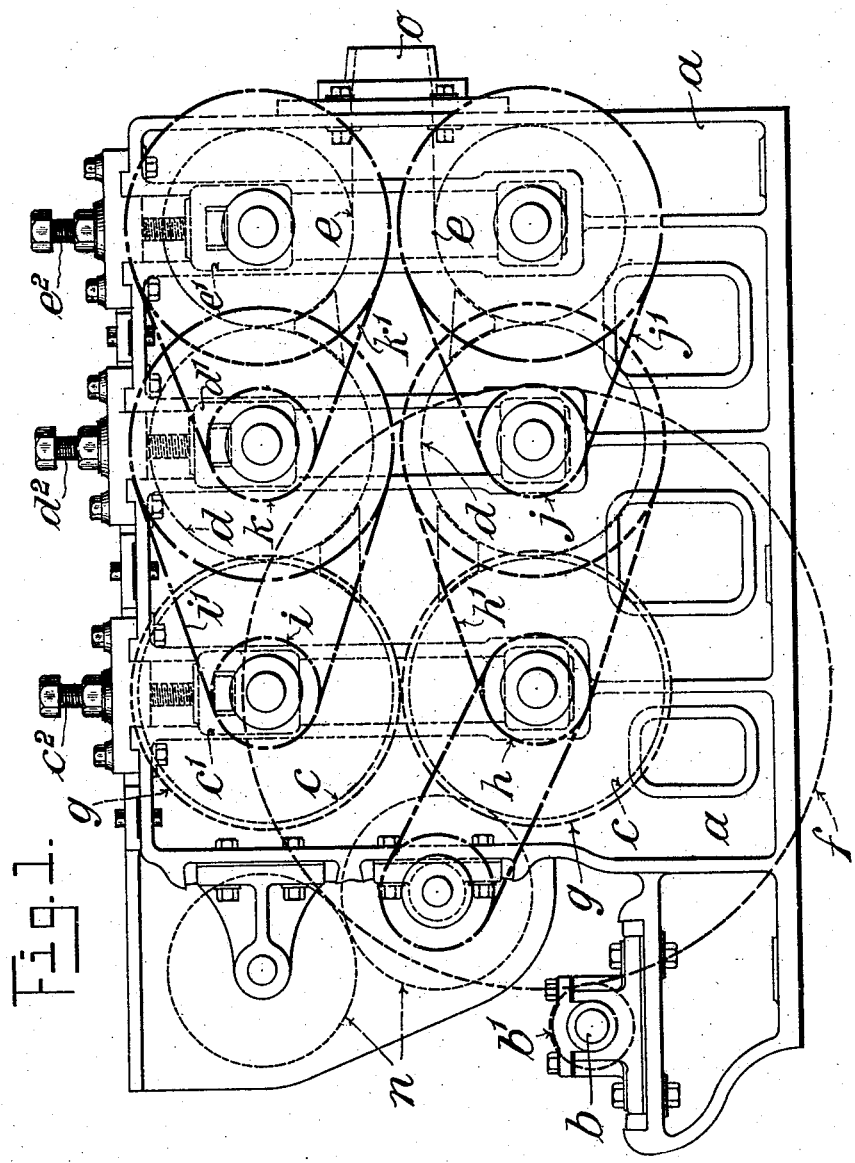

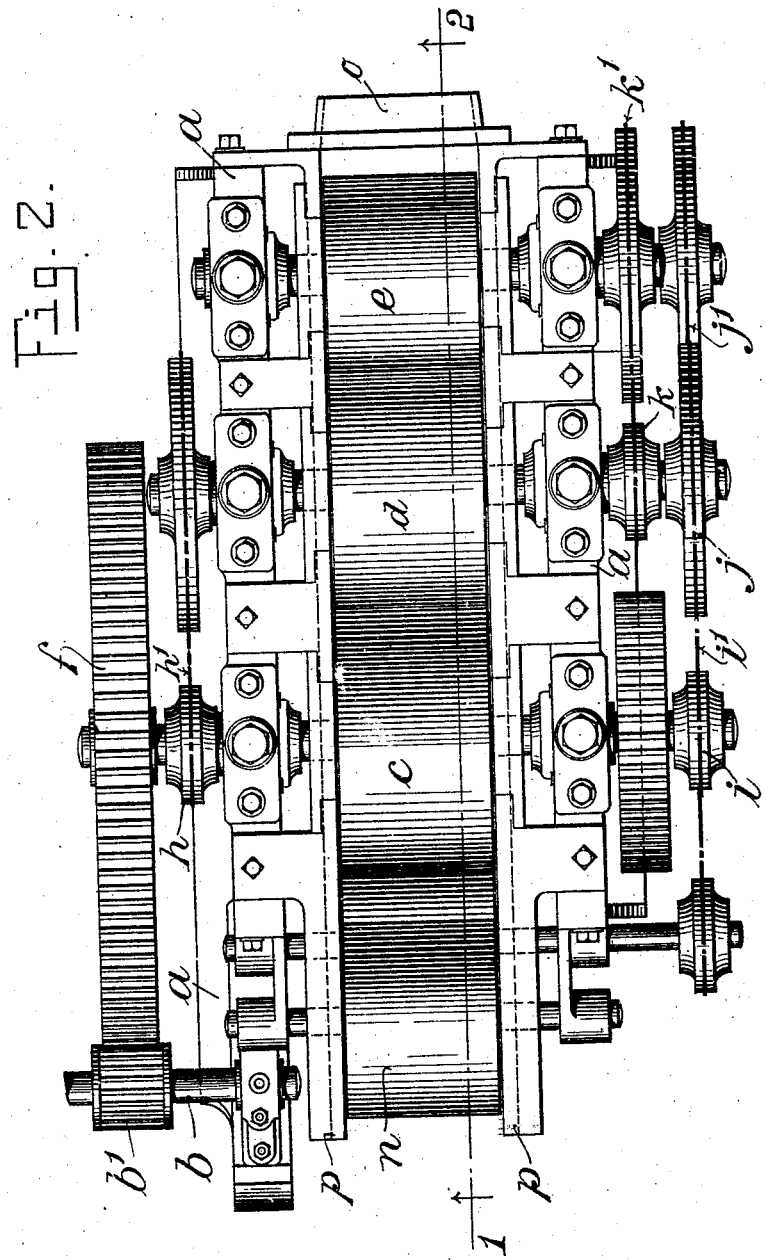

No. 845,329. PATENTED FEB. 26, 1907.
J. W. BOTTOMLEY.
PLASTIC BRICK OR LIKE MOLDING MACHINE.
APPLICATION FILED OCT. 12, 1906.
3 SHEETS—SHEET 3.
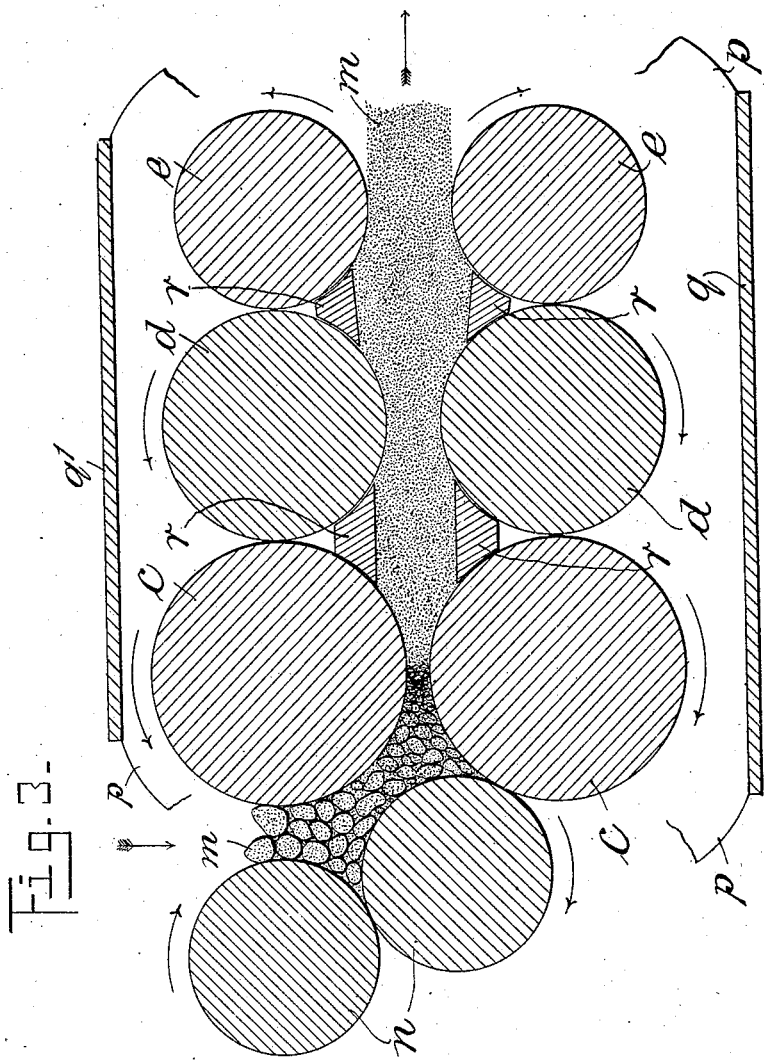

UNITED STATES PATENT OFFICE.

JOHN WILLIAM BOTTOMLEY, OF LEEDS, ENGLAND.

PLASTIC BRICK OR LIKE MOLDING MACHINE.

No. 845,329.　　　　Specification of Letters Patent.　　　　Patented Feb. 26, 1907.

Application filed October 12, 1906. Serial No. 338,624.

*To all whom it may concern:*

Be it known that I, JOHN WILLIAM BOTTOMLEY, a subject of King Edward VII of Great Britain, and a resident of Leeds, in the county of York, England, have invented certain new and useful Improvements in Plastic Brick or Like Molding Machines, of which the following is a specification.

This invention relates to the production of bricks, tiles, and the like from clay or like plastic material, and comprises a new or improved multiple-roller machine in which the clay or plastic material fed from a pan and mixer or other source is caused to pass between two, three, or more pairs of rollers set at different distances apart or of decreasing diameters, whose action on the clay thoroughly mixes or unites it before entering the die and avoids the formation of cracks, laminations, or weak places in the bricks, tiles, or like clay goods produced.

In the present method of producing bricks, tiles, or the like the clay may be passed through a pug-mill and then between a pair of expression-rolls, or it may be fed direct from a pan or other source to a hopper, which delivers it to the rolls without passing through the pug-mill. The action of the pug-mill on the stream of clay, which delivers it to the die at an enormous compression, causes it or the middle portion thereof to be twisted or "cored," and the bricks or tiles cut from such stream of clay frequently present cracks or fissures extending from the middle to near each side, which considerably weaken the bricks or tiles or render them useless. To modify the twisting action of the pug or to dispense with the use of the pug-mill, the clay is commonly caused to pass between a pair of expression-rolls, from which it is expressed in a thin layer or column and is forced forward into the die, the layer or column on leaving the rolls zigzagging or forming into folds and entering the die in a laminated condition. These folds or laminations of the clay frequently pass through the die without being thoroughly united, or if the clay be rich fail altogether to unite, and the bricks or tiles produced are therefore faulty or useless.

The object of my invention is to avoid or minimize the production of bricks, tiles, or the like having cracks or weak places therein caused by the action of the pug-mill on the clay or by its passage through the expression-roller machine, or both.

To this end the invention consists in providing a machine in which are two, three, or more pairs of rollers or expression-rolls, the second pair of rolls being of less diameter than the first pair of rolls to give between the opposing peripheral surfaces a gap or space of suitable larger area or depth than the gap or space between the first pair of rolls, and the next succeeding pair of supplementary or third pair of rolls are of still smaller diameter to give a greater space between them than between the said preceding pair of rolls.

As many pairs of rolls as is desired may be employed, and I may regulate the distance between the rolls of each succeeding pair with respect to the second or second and third pairs of rolls as required.

In the accompanying drawings, Figure 1 is side elevation of my improved multiple-roller machine, showing one method of giving motion to the several rollers. Fig. 2 is plan view of Fig. 1; and Fig. 3 is a longitudinal section taken as on line 1 2, Fig. 2, showing the arrangement of the multiple pairs of rollers according to my invention, the framing and driving mechanism of the machine being omitted to give a clear illustration of the improvements embodying my invention.

Referring to the drawings, letter $a$ represents the side frames of the machine; $b$, the main driving-shaft, and $c\ d\ e$ the three pairs of rollers constituting the improved multiple-roller machine for plastic brick or tile molding. The shafts of the bottom rollers of each pair of rollers are supported in bearings in the side frames $a$, and the shafts of the upper rollers of each pair of rollers are journaled in bearings in blocks $c'\ d'\ e'$, located in slotted openings in the side frames and adapted to be moved vertically by screws $c^2\ d^2\ e^2$ to adjust the position of the top rollers.

On the main shaft $b$ is fast a pinion $b'$, which gears with a spur-wheel $f$, fast on the shaft of the bottom roller of the first pair of rollers $c$, to which motion is first imparted. The bottom roller of the pair of rollers $c$ drives the top roller of said pair through spur-gears $g$, fast on the shafts of the respective rollers. On the shafts of the lower and upper rollers of the first pair of rollers $c$ are secured sprocket-wheels $h\ i$, which by means of chains $h'\ i'$ convey motion to the lower and upper rollers of the second pair of rollers $d$. The shafts of the latter have secured at one outer end thereof sprocket-wheels $j\ k$, which by means of chains $j'$ $k'$ impart rotary motion to the lower and upper rollers of the third pair of rollers $e$. It will be manifest that this is only one system which may be adopted for driving the various rollers and that other systems may be employed without affecting my invention.

The essential feature of my invention consists in providing two, three, or more pairs of rollers mounted closely together side by side, the second pair of rollers $d$ being of less diameter than the first pair $c$, and the third pair $e$ of less diameter than the second pair $d$, and so on, if more than three pairs of rolls are employed.

Instead of each pair of the rollers after the first pair being of reduced diameters, as explained, the axes of the rollers in each such succeeding pair may be set at increasing distances apart to obtain the same result; but I consider the system of employing rollers of various diameters and mounting the axes of each upper and lower series in the same horizontal planes, as shown on the drawings, to be the best and most efficient, and preferably adopt it.

As explained, the rollers $d$ are of less diameter than the rollers $c$ and the rollers $e$ of correspondingly less diameter than the rollers $d$, the relative diameters of each pair of rollers being such that in this instance, assuming that the distance between the opposing peripheral surfaces of the rollers $c$, which as in ordinary compression-rollers are set at a predetermined distance from each other, should be, say, one inch, the spaces between the rollers of the pairs of rollers $d$ $e$ will be in the relative proportions of three and five inches, respectively; but they may be in any other relative proportions, as will best suit individual requirements, such proportions being easily varied by adjusting the upper rollers of each pair of rollers or of one or more of same to the extent desired to enlarge or reduce the area between the rollers of each or one or more of the pairs of rollers.

The surface speeds at which the second or second and each following pair of rolls are driven will vary according to the respective diameters and the difference in the rate of feed of the clay as it passes from one pair of rollers to the other.

The clay or other plastic material $m$ is fed by a hopper or chute or by hand to the feed-rollers $n$ at the front of the machine, which carry it forward between said rollers and the top roller of the first pair of rollers $c$ to the clay space between said first pair of rotating rollers, where it is squeezed or expressed and expands into the space between the first and second pair of rollers, being carried forward from thence and squeezed between the second pair of rotating rollers $d$ and expanding into the space between the second and third pairs of rollers, by the latter of which it is then caught and forced in a column of, say, five inches thick direct into and through a die $o$ of the required size of brick. On leaving the die the column passes to a cutting-table of any ordinary description to be cut into bricks or blocks.

In the treatment of the plastic material in the manner set forth there is a gradual expansion of the clay to the rectangular, the succeeding expressions of the material between the rollers thoroughly mixing or uniting it without any screwing action or liability of lamination, the whole pressure of the clay coming directly onto the mold and minimizing internal friction.

The rollers $c$ $d$ $e$ are of uniform width, and secured close up to the ends of same are side plates $p$, which form a box to retain the clay within the width of the rollers. To the upper and lower edges of the said side plates may be secured transverse plates $q$ $q'$, Fig. 3, to inclose the rollers at top and bottom, the top plate causing any clay which may adhere to the rollers and be carried to the top thereof from accumulating in any quantitiy and the bottom plate receiving the clay which may fall from the rollers and which can readily be cleared away from time to time by the use of a hand-scraper.

As a means of preventing the clay as it expands into the increasing angular spaces between the pairs of rollers from being carried between the adjacent rollers in each series I introduce into the said angular spaces plates $r$, which are secured by bolts or like means to the side plates or frames, these said plates $r$ serving as scrapers and keeping the clay away from the nip between the adjacent rollers.

The second pair of rollers $d$ is driven at a slower peripheral speed than the first pair $c$, and the third pair $e$ is driven at a still slower speed. The crushed clay expands into the chamber formed between the rollers $c$ and $d$ and the plates $r$ and the side plates, and its motion is checked therein by the rollers $d$ until it is partially consolidated. It is then compressed, kneaded, and fed forward by the rollers $d$. After passing under the rollers $d$ the clay is a second time allowed to expand in the second expansion-chamber, which has a greater area than the first expansion-chamber so that the clay is formed into a thicker mass. This mass becomes more thoroughly consolidated, and it is then compressed, kneaded, and fed forward by the rollers $e$. In this manner all laminations, cracks, and breaks are worked out of the clay, and it is formed into a homogenous mass of the most convenient thickness.

The rollers of the pairs of rollers $c$ $d$ $e$ may have plain surfaces, as shown, or they may be roughened or fluted, and they could be made concave, convex, or of other suitable shape longitudinally, if desired. Some of the rollers might be flanged, if necessary, to assist in feeding the clay between them.

At the delivery end of the machine the side plates may be slotted or end plates arranged to overlap each other, provided in order that steam, water, or oil can be forced through same from a jacket or box to lubricate the edges of the stream of clay to facilitate its passage and remove friction. As the lubrication of a column of clay in this manner is common to the ordinary pug-mill, I have not shown on the drawings any provision for doing it, as it will be well understood.

Having thus described my invention, what I claim as new, and desire to secure by Letters Patent, is—

1. In a plastic brick or like molding machine, a plurality of rollers arranged in pairs one behind the other, the second or each succeeding pair of rollers being of smaller diameter or set farther apart than the preceding pair of rollers to give a gradually-increasing clay-space between each pair of rollers, in the manner and for the purpose substantially as herein shown and described.

2. The improved multiple-roller machine for making bricks, tiles and like clay goods, comprising essentially two or more pairs of rollers, each pair of different diameter or set at increasing distances apart, and of uniform width, the column of clay being confined to the rollers by side plates at the rear end of which is a mold or die through which the column of clay is finally caused to pass after being acted upon by the pairs of rollers, each roller in each pair of rollers being suitably driven so that the surface speeds of each pair vary according to the respective diameters and the difference in the rate of feed of the clay as it passes from one pair of rollers to the other, substantially as herein shown and described.

3. The combination with two or more pairs of rollers, each succeeding pair being of smaller diameter than the preceding pair, or otherwise of the same diameter, and set farther apart and means for driving said rollers and confining the clay at the ends of the rollers, of plates or clearers secured in the angles between each pair of rollers to prevent the clay being carried forward between adjacent rollers in each pair of rollers, all constructed, arranged and operating substantially as herein set forth.

4. The combination, with a series of rollers arranged in pairs with their peripheries at increasing distances apart, and means for revolving the said rollers with decreasing peripheral speed; of plates secured between the adjacent upper and lower rollers, and plates secured at the ends of the rollers, said plates forming expansion-chambers of increasing area for the clay to pass through.

In testimony whereof I affix my signature in the presence of two witnesses.

JOHN WILLIAM BOTTOMLEY.

Witnesses:
JOHN HENRY CLAUGH,
THOMAS HENRY BARRON.